United States Patent [19]
Kyoto et al.

[11] Patent Number: 4,664,690
[45] Date of Patent: May 12, 1987

[54] METHOD FOR PRODUCING GLASS PREFORM FOR OPTICAL FIBER

[75] Inventors: Michihisa Kyoto; Minoru Watanabe; Yoichi Ishiguro, all of Yokohama, Japan

[73] Assignee: Sumitomo Electric Industries, Ltd., Osaka, Japan

[21] Appl. No.: 748,561

[22] Filed: Jun. 25, 1985

[30] Foreign Application Priority Data

Sep. 19, 1984 [JP] Japan .............................. 59-194793

[51] Int. Cl.$^4$ ........................................... C03B 37/027
[52] U.S. Cl. ..................................... 65/3.12; 65/30.12; 65/13; 65/18.2
[58] Field of Search ............... 65/2, 3.12, 30.12, 18.2, 65/13, 31, 32

[56] References Cited
U.S. PATENT DOCUMENTS

| | | | |
|---|---|---|---|
| 4,304,583 | 12/1981 | Aronson et al. | 65/3.12 X |
| 4,338,111 | 7/1982 | Edahiro et al. | 65/18.2 |
| 4,367,085 | 1/1983 | Sato et al. | 65/3.12 X |
| 4,378,985 | 4/1983 | Powers | 65/13 X |
| 4,552,576 | 11/1985 | Hara et al. | 65/2 |

Primary Examiner—Robert Lindsay
Attorney, Agent, or Firm—Cushman, Darby & Cushman

[57] ABSTRACT

A method for producing a glass preform for an optical fiber comprising flame hydrolyzing a glass raw material in an oxyhydrogen flame to form glass fine particles, depositing the glass fine particles on a seed member to produce a solid or hollow cylindrical soot preform, dehydrating by holding the whole soot preform in an atmosphere containing a dehydrating agent kept at such temperature for such period of time that the diameter of the soot preform shrinks by at least 20%, and heating and sintering the dehydrated soot preform by introducing it from its one end in an atmosphere of a pure inert gas to produce a glass preform having a uniform distribution of refractive index along its length, from which glass preform, an optical fiber having attenuation of light transmission as low as 1 dB/km or less at a wavelength of 1.30 micrometer is fabricated.

4 Claims, 5 Drawing Figures

He, Cl2, O2

He
Cl2, O2

METHOD FOR PRODUCING GLASS PREFORM FOR OPTICAL FIBER

FIELD OF THE INVENTION

The present invention relates to a method for producing a glass preform for an optical fiber. More particularly, it relates to a method for producing a glass preform for use in the fabrication of an optical fiber with a homogeneous composition along its length and low attenuation of light transmission by means of flame hydrolysis.

BACKGROUND OF THE INVENTION

Methods suitable for mass production of a glass preform for use in the fabrication of an optical fiber includes a vapor phase axial deposition method (hereinafter referred to as a "VAD" method and an outside vapor phase deposition method (hereinafter referred to as a "OVPD" method). These deposition methods comprise flame hydrolyzing a glass raw material such as $SiCl_4$ optionally containing an additive (eg. $GeO_2$) in an oxyhydrogen flame to form glass fine particles of pure quartz ($SiO_2$) or quartz containing the additive with an average particle size of about 0.1 micrometer, depositing the glass fine particles on a seed member to produce a porous soot preform and sintering the soot preform at a high temperature to obtain a transparent glass preform. According to the VAD method, the glass fine particles are deposited on the rotating seed member in parallel with the rotating axis of the member to continuously form the solid cylindrical soot preform (cf. U.S. Pat. No. 4,135,901). According to the OVPD method, the glass fine particles are deposited on a rotating rod member made of alumina or quartz glass from a direction perpendicular to the rotating axis of the member to form multiple thin layers of the glass fine particles (cf. U.S. Pat. Nos. 3,711,262, 3,737,292 and 3,737,293). The produced porous soot preform is then heated and sintered in an atmosphere of an inert gas such as helium at a high temperature to make the soot preform transparent to obtain the glass preform.

A practically used optical fiber is required to have low attenuation of light transmission, and it is essential for the optical fiber to have total attenuation of light transmission not larger than 1 dB/km, particularly, at wavelength of 1.30 micrometer which is used for long-distance optical telecommunication. Therefore, it is required to decrease an amount of residual water (i.e. hydroxyl groups) in the optical fiber which absorbs light with a wavelength of 1.38 micrometer and influences light transmission at a wavelength of 1.30 micrometer. FIG. 1 shows a relationship between the amount of residual water in the optical fiber and attenuation of light transmission at a wavelength of 1.30 micrometer. As is clear from this relationship, the amount of residual water should be less than 0.3 ppm to decrease attenuation of light transmission to less than 0.3 dB/km.

Since theoretical limit of attenuation of light transmission of glass material at a wavelength of 1.30 micrometer is 0.3 to 0.4 dB/km, total attenuation of light transmission at this wavelength amounts to 0.6 to 0.7 dB/km.

To reduce total attenuation of light transmission to less than 1 dB/km, it is, therefore, necessary to reduce attenuation of light transmission attributed to other factors, particularly, absorption by impurities such as transition metals (eg. copper and iron) as low as possible.

Table 1 shows an amount of impurity element which causes 20 dB/km of attenuation of light transmission at a wavelength of 0.8 micrometer.

TABLE 1

| Element | Amount (ppb) |
|---------|--------------|
| V       | 19           |
| Cr      | 33           |
| Mn      | 833          |
| Fe      | 425          |
| Co      | 816          |
| Ni      | 712          |
| Cu      | 9            |

As seen from Table 1, it is important to reduce the amount of the impurities less than 1 ppb in order to decrease attenuation of light transmission of the optical fiber. Attenuation of light transmission due to copper at a wavelength of 1.30 micrometer is about one fifth of that at a wavelength of 0.8 micrometer.

In addition, attenuation of light transmission is also caused by bubbles present in the optical fiber. Such bubbles are formed mainly of gaseous chlorine which is used as a dehydrating agent of a soot preform or gaseous $GeO_2$ which is added as an additive for adjusting refractive index of glass.

Recently, a large-sized glass preform for the optical fiber is produced. for example, the VAD method produces such a large glass preform that 200 km of the optical fiber is fabricated therefrom. The large-sized glass preform is required to have more homogeneous and stable composition along its length than a smaller glass preform. Particularly, $GeO_2$ volatilizes during dehydration and sintering of the soot preform according to the following equation (I) or (II):

At a temperature higher than 800° C.:

$$GeO_2 \rightarrow GeO + O_2 \qquad (I)$$

At a temperature higher than 900° C.:

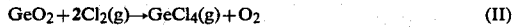
$$GeO_2 + 2Cl_2(g) \rightarrow GeCl_4(g) + O_2 \qquad (II)$$

Where (g) stands for a gas state. Therefore, a volatilized amount of $GeO_2$ varies with slight change of dehydration and/or sintering conditions (for example, temperature) and of the flow rate of chlorine, resulting in change of distribution of refractive index of the glass preform along its length.

For instance, according to a method disclosed in U.S. Pat. No. 3,993,454, a soot preform comprising a core made of $SiO_2$ glass containing $GeO_2$ is sintered by gradually introducing it from its one end in a furnace with an atmosphere of helium containing chlorine (namely, a gradient sintering method). The produced transparent glass preform has refractive index difference of 0.3% between one end and the other, which corresponds to about 5% by weight difference of the amount of $GeO_2$.

There is known another method for sintering the soot preform which comprises introducing the whole soot preform in an atmosphere containing chlorine and gradually raising temperature to a sintering temperature at which the soot preform is converted to the transparent glass preform (cf. U.S. Pat. No. 4,338,111). Although this method is suitable for stabilization of the refractive index distribution along length of the preform, it has a disadvantage that the produced glass preform tends to contain bubbles in comparison with that produced by the gradient sintering method.

SUMMARY OF THE INVENTION

One object of the present invention is to provide a method for producing a glass preform having a uniform distribution of refractive index along its length.

Another object of the present invention is to provide a method for producing a glass preform from which an optical fiber having attenuation of light transmission as low as 1 dB/km or less at a wavelength of 1.30 micrometer is fabricated.

Accordingly, the present invention provides a method for producing a glass preform for an optical fiber comprising flame hydrolyzing a glass raw material in an oxyhydrogen flame to form glass fine particles, depositing the glass fine particles on a seed member to produce a solid or hollow cylindrical soot preform, dehydrating by holding the whole soot preform in an atmosphere containing a dehydrating agent kept at such temperature for such period of time that the diameter of the soot preform shrinks by at least 20%, and heating and sintering the dehydrated soot preform by introducing it from its one end in an atmosphere of a pure inert gas.

DETAILED DESCRIPTION OF THE INVENTION

By the study of the present inventors, it has now been found that one of the causes for the unstability of the refractive index of the soot preform produced by the method disclosed in U.S. Pat. No. 3,993,459 is that the soot preform is dehydrated and sintered by gradually introducing it from its one end in a dehydrating and sintering atmosphere, namely, by the gradient sintering method. Therefore, the volatilized amount of $GeO_2$ varies with slight change of the flow rate of the dehydrating agent and/or temperature, and further once volatilized GeO and/or $GeCl_4$ deposits as $GeO_2$ on the soot preform, which changes the refractive index. Another cause is that the dehydration is carried out at such a high temperature that the preform is made transparent.

Figure 1:
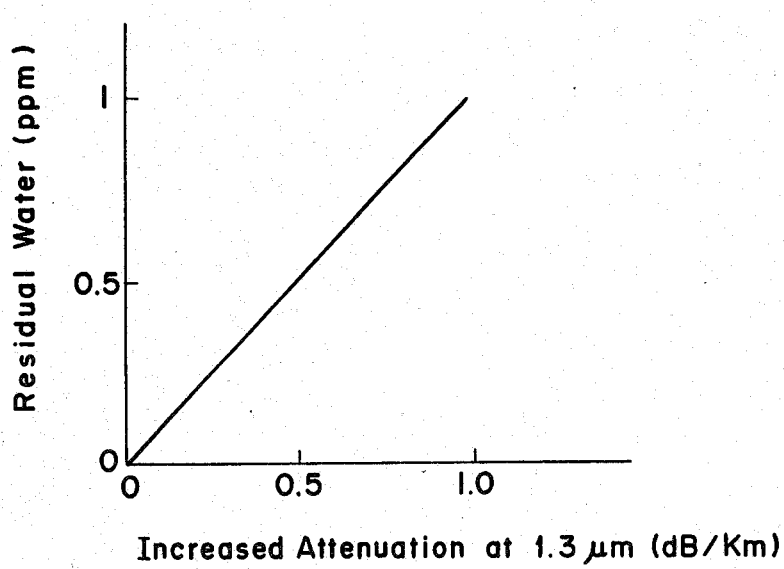
FIG. 1 is a graph showing relationship between the amount of residual water and increased attenuation of light transmission at a wavelength of 1.30 micrometer.
Figure 2:
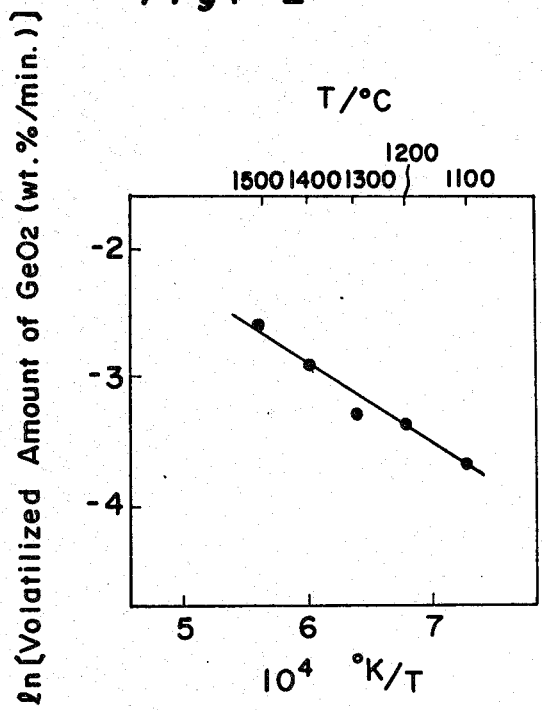
FIG. 2 is a graph showing relationship between the volatilized mount of $GeO_2$ and temperature.

The relationship between the volatilized amount of $GeO_2$ and the heating temperature has already been examined by heating the soot preform of $SiO_2$ containing $GeO_2$ in a helium atmosphere. The results are shown in FIG. 2. As seen from this graph, the volatilized amount of $GeO_2$ increases as the temperature is raised. For example, the volatilized amount at 1,500° C. is about 5 times larger than at 1,100° C. (8th Conference of Optical Communication, C–25, 629–632 (1982)).

Figure 3:
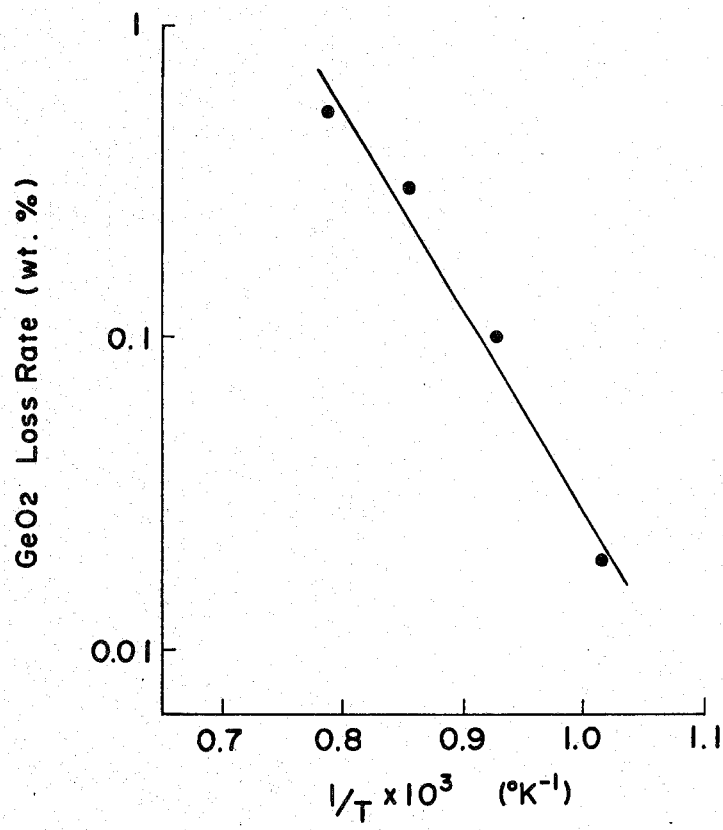
FIG. 3 is a graph showing dependency of chlorination of $GeO_2$ on temperature.

Dependency of the chlorination of $GeO_2$ on temperature are shown in FIG. 3. From this graph, it is seen that the volatilized amount of $GeO_2$ increases as the temperature is raised. According to the experiment by the present inventors, the dependency of the volatilized amount (V) of $GeO_2$ on temperature is expressed by the following equation:

$$V = A \times exp(+40 \times 10^3/RT)$$

wherein A is a constant, R=1.987 cal/mol, and T is an absolute temperature (°K.). From this equation, it is found that the volatilization has activation energy of 40 Kcal/mol.

As understood from the above discussion, it is not suitable for producing a glass preform with uniform distribution of the refractive index along its length to dehydrate the soot preform at such high temperature as the soot is made transparent by the gradient sintering method since $GeO_2$ is too vigorously volatilized.

Bubble formation has also been studied. The bubbles are formed when the whole soot preform is held in the sintering atmosphere according to the method described in U.S. Pat. No. 4,338,111. A cause for the bubble formation is assumed as follows:

When the whole soot preform is held in the sintering atmosphere, since its periphery is first converted to transparent glass, GeO and/or $GeCl_4$ generated from $GeO_2$ are confined in the space of the porous center portion of the soot preform which has not been converted to transparent glass. The greater the raising rate of temperature and the larger the diameter of the soot preform, the more bubbles are formed. The soot preform with a diameter of 80 mm, for example, contains the considerable number of bubbles, and one with a diameter of 120 mm or larger, a soot length of 50 cm contains 3 to 8 bubbles which are identified with naked eyes. When the soot preform has a larger diameter, distribution of bulk density fluctuates in its radial direction, and the temperature difference between the periphery and the center is large, in an extreme case, about 100° C. Therefore, the periphery of the soot preform is more quickly converted to transparent glass than the center portion so that the bubbles are confined in the center portion.

Further study revealed that when a soot preform having a diameter larger than 80 mm is sintered by the gradient sintering method, it so quickly shrinks in its radial direction that the periphery of the preform tends to crack, and almost all the cracks are formed before the preform shrinks by about 20% in its radial direction but, thereafter, no crack is formed. Thus, it is concluded that soot preform is to be shrunk with holding the whole preform in the sintering atmosphere instead of sintering it by the gradient sintering method at least before the preform shrinks by about 20% in its radial direction.

The soot preform to be used in the method of the present invention may be produced by a per se conventional method, for example, the VAD method, the OVPD method, etc.

According to the present invention, the soot preform is dehydrated in an atmosphere of, for example, helium, argon, nitrogen or oxygen containing a dehydrating agent (eg. a chlorine-containing compound such as $Cl_2$, $SOCl_2$ and $CCl_4$ and a fluorine-containing compound such as $F_2$, $SF_6$ and $CF_4$).

Preferably, the soot preform is dehydrated at a temperature not higher than 1,400° C., more preferably from 1,100 to 1,400° C. If it is dehydrated at a temperature higher than 1,400° C., the soot preform shrinks so quickly that it tends to crack.

After dehydration, the preform is gradually introduced in the sintering atmosphere of an inert gas (eg. helium, argon, nitrogen, etc.), preferably, at a temperature of 1,500 to 1,900° C. If it is sintered at a temperature higher than 1,900° C., it is undesirably drawn.

The method of the present invention is particularly useful for a soot preform with a large diameter, for example, larger than 80 mm.

The present invention will be hereinafter explained further in detail by following EXAMPLES, in which % are by weight unless otherwise indicated.

EXAMPLE 1

By the VAD method, produced were six porous soot preforms each comprising a core made of glass consisting of 94% of $SiO_2$ and 6% of $GeO_2$ and a jacket made of pure silica. The soot preform had an outer diameter of 90 mm and a length of 600 mm. A ratio of a core diameter and a cladding diameter was so adjusted as to give an optical fiber with a core/cladding ratio of 10/125 (micrometer/micrometer).

Each soot preform was dehydrated and then sintered under conditions shown in Table 2 to obtain a transparent glass preform.

Form the thus produced glass preform, an optical fiber was fabricated by a per se conventional method and characteristics of the fiber were examined.

Figure 4:
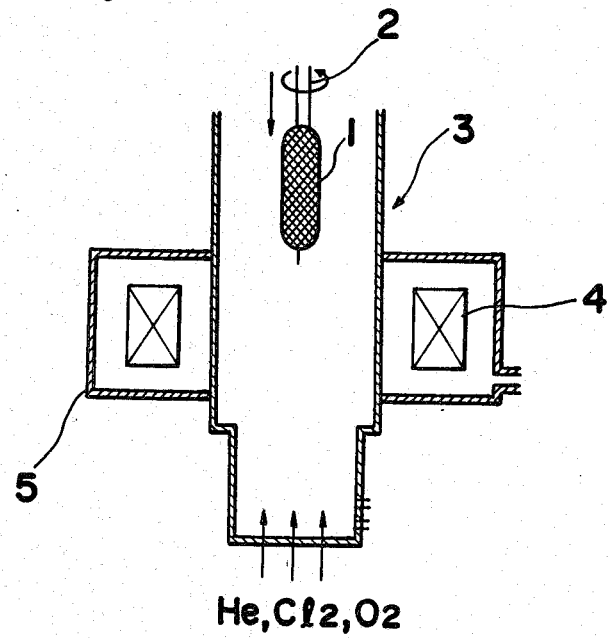
FIG. 4 shows a furnace used for the gradient sintering method.

Among the preform, Nos. 1 to 3 were for comparison and dehydrated and sintered by gradually introducing it at a rate of 2 mm/min. in a furnace of FIG. 4, wherein numerals 1, 2, 3, 4, 5, 6 and 7 represent a soot preform, a supporting rod, a muffle tube, a heater, a furnace body, an inlet for introducing atmospheric gas and an outlet, respectively.

The produced transparent glass preform shrank by 50% in its radial direction and contained bubbles. Particularly, Preform No. 2 cracked spirally from its one end to the other. Specific refractive index difference ($\Delta n$) at the both ends of the preform was measured to be about 50% in all of Preform Nos. 1 to 3.

Optical fibers fabricated from Preform Nos. 1 and 3 had attenuation of light transmission of 0.7 to 1.5 dB/km and residual water of 0.4 to 0.5 ppm. Attenuation of light transmission was increased apparently by the bubbles. Any optical fiber could not be fabricated from Preform No. 2.

Figure 5:
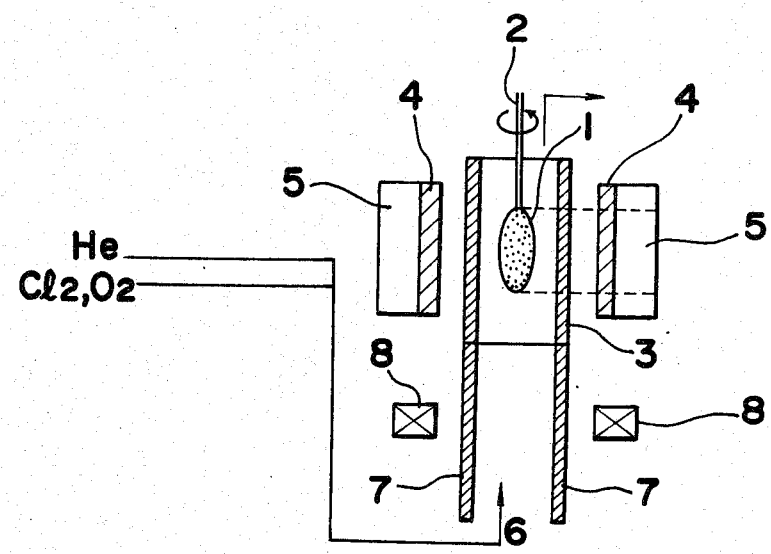
FIG. 5 shows another furnace used in Examples according to the present invention.

Each of Preform Nos. 4 to 6 was inserted in the first upper furnace of FIG. 5 having enough length to contain the whole length of the preform. Then, it was dehydrated with flowing helium, chlorine and oxygen at predetermined rates and the temperature of the furnace was raised from 800° C. to 1,350° C. at a rate of 3.3° C./min. and kept at the same temperature for 1 hour. Then, the supply of chlorine and oxygen was terminated and then the dehydrated preform was gradually lowered in the second furnace positioned below the first furnace in a helium atmosphere. In FIG. 5, numerals 1 to 6 are the same as in FIG. 4, and numerals 7 and 8 represent the second furnace for sintering the preform and a heater for the second furnace 7, respectively.

Thus produced Preform Nos. 4 to 6 were transparent glass preforms containing no bubble. Shrink in the radial direction was 35% and the specific refractive index difference was stable along its length as shown in Table 2.

All Prefrom Nos. 4 to 6 could be drawn to form optical fibers, each of which had attenuation of light transmission of 0.35 to 0.5 dB/km at a wavelength of 1.30 micrometer and residual water of less than 0.1 ppm.

The same soot preform was dehydrated under the same condition as in case of Preform No. 4 but heating it at 1,000° C. Shrink of the preform in the radial direction was about 5%. When the dehydrated preform (No. 7) was sintered at 1,675° C., it spirally cracked.

TABLE 2

| | Dehydration and sintering conditions | | | | | $\Delta n$ (%) | | |
|---|---|---|---|---|---|---|---|---|
| | Flow rate of gas (l/min.) | | | Temp. | Lowering rate | Front | Rear | |
| No. | $Cl_2$ | $O_2$ | He | (°C.) | (mm/min.) | end | end | Note |
| 1 | 0.4 | 0.4 | 15 | 1,675 | 2 | 0.358 | 0.241 | Containing bubbles |
| 2 | 0.3 | 0.4 | 15 | 1,675 | 2 | 0.384 | 0.183 | Containing bubbles |
| 3 | 0.3 | 0.4 | 15 | 1,675 | 2 | 0.403 | 0.261 | Containing bubbles |
| | (Dehydration conditions) | | | | | | | |
| 4 | 0.2 | 0.4 | 15 | 1,350 | — | 0.35 | 0.35 | No bubble |
| 5 | 0.2 | 0.4 | 15 | 1,350 | — | 0.27 | 0.27 | No bubble |
| 6 | 0.2 | 0.4 | 15 | 1,350 | — | 0.37 | 0.37 | No bubble |
| 7 | 0.2 | 0.4 | 15 | 1,000 | — | — | — | Cracked |

EXAMPLE 2

By the OVPD method, fine glass particles consisting of 85% of $SiO_2$ and 15% of $GeO_2$ were deposited around an alumina mandrel of 6 mm in diameter and 50 cm in length to a diameter of 50 mm followed by deposition of fine glass particles of pure quartz to a diameter of 100 mm. Then, the alumina mandrel was removed to produce a hollow cylindrical soot preform (No. 8).

Preform No. 8 was inserted in the first upper furnace of FIG. 5 and dehydrated with flowing helium, and chlorine at 10 liters/min. and 50 ml/min., respectively and the temperature of the furnace was raised from 800° C. to 1,150° C. at a rate of 3.3° C./min. and kept at the same temperature for 2 hours. By the dehydration, the soot preform shrank by 30% in its radial direction. The thus dehydrated soot preform was heated in a pure helium atmosphere by introducing it in the furnace of FIG. 4 kept at 1,650° C. at a rate of about 5 mm/min. to obtain a transparent glass preform without bubble. An optical fiber fabricated from the glass preform had attenuation of light transmission of 0.4 dB/km at a wavelength of 1.30 micrometer and residual water of 0.1 ppm. Specific refractive index reference was 1% which means the distribution of the refractive index was uniform along length of the fiber.

For comparison, the same proform (No. 9) as Preform No. 7 was dehydrated in the furnace of FIG. 5 under the same condition as Preform No. 7 and, then in the same furnace, heated in a pure helium atmosphere to 1,650° C. to obtain a transparent glass preform, which contained many bubbles in its center portion. After dehydration, the preform shrank by 30% in its radial direction.

The same soot preform (No. 10) was dehydrated under the same conditions as Preform No. 7 but raising and keeping temperature to 1,000° C. instead of 1,150° C. It shrank by 5%. The thus dehydrated preform was heated under the same conditions as Prefrom No. 7 resulting in cracks on the surface.

What is claimed is:

1. A method for producing a glass preform for an optical fiber comprising
   flame hydrolyzing a glass raw material in an oxyhydrogen flame to form glass fine particles,
   depositing the glass fine particles on a seed member to produce a solid or hollow cylindrical soot preform having a diameter larger than 80 mm and containing $GeO_2$ in at least a part thereof,
   dehydrating by holding the soot preform in a furnace having a sufficient length to heat the whole soot preform at uniform temperature in an atmosphere containing a dehydrating agent kept at such temperature for such period of time that the diameter of the soot preform shrinks by at least 20%, and
   heating and sintering the dehydrated soot preform by gradually introducing it from its one end in an atmosphere of helium.

2. A method according to claim 1, wherein the dehydration temperature is not higher than 1,400° C.

3. A method according to claim 2, wherein the dehydration temperature is from 1,100° to 1,400° C.

4. A method according to claim 1, wherein the sintering temperature is from 1,500° to 1,900° C.